Feb. 9, 1960 R. K. CUMMINS 2,924,046
QUARTZ WORKING
Filed Feb. 8, 1956
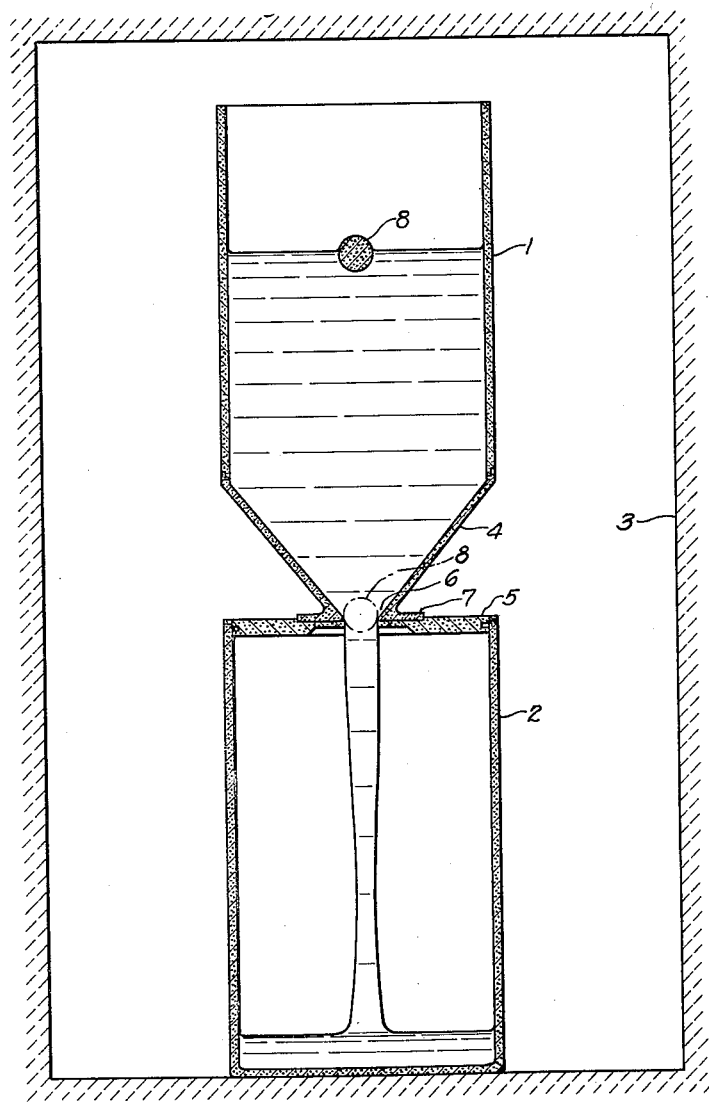
Inventor:
Robert K. Cummins,
by Otto Tichy
His Attorney.

United States Patent Office 2,924,046
Patented Feb. 9, 1960

2,924,046

QUARTZ WORKING

Robert K. Cummins, Euclid, Ohio, assignor to General Electric Company, a corporation of New York Application February 8, 1956, Serial No. 564,169

2 Claims. (Cl. 49—78.1)

The present invention relates to the production of vitreous silica known generally as fused quartz.

Ingots of fused quartz are successfully prepared from crystalline quartz by first melting quartz crystals in the upper part of a refractory container. After fusion and while still plastic the fused quartz is caused to pass by gravity from the upper to the lower part of the container through a tapered throat providing a passage of decreasing cross-section in the direction of flow of the molten quartz. This subjects the plastic quartz to constrictive pressure so applied as to displace the larger bubbles or voids which occur in the quartz mass while melting. These bubbles or voids are displaced toward the top of the melted mass of quartz as the latter passes gradually downward through the throat to the lower part of the container to form the ingot. In practice the fusion of the quartz takes place in a vacuum and the fused quartz, after passage through the throat and while still plastic in the lower part of the container, is subjected to an inert gas under considerable pressure to reduce the size of those bubbles or voids which remain in the molten quartz after it passes through the throat. The fused quartz is then allowed to cool.

Containers of graphite are customarily used for making fused quartz in the above described manner as this material is sufficiently refractory to withstanding the extremely elevated temperatures to which it is subjected during fusion of the quartz crystals and is sufficiently inert with respect to silica as to reduce contamination of the fused quartz to a minimum.

In spite of the utmost care in the selection of the graphite making up the container and of the quartz crystals used as the raw material for the melt, I have observed that, frequently enough to add considerably to the cost of manufacturing such fused quartz ingots, discoloration of the quartz at the core of the ingot occurs and the fused quartz is not clear. The cause of this discoloration has not been known heretofore in spite of prior investigations aimed at reducing the number of discolored quartz ingots discarded and at lowering the cost of manufacture of the fused ingots.

The principal object of the present invention is to reduce the cost of clear fused quartz ingots by completely eliminating discoloration of such ingots. Further objects and advantages of the invention will appear from the following description of an apparatus for carrying out my invention.

In the course of my investigations of the cause of the difficulty I have discovered that the source of the discoloration is the products of reaction between the silica and the graphite at the upper part of the container in which the quartz crystals are melted. These reaction products float on the surface of the quartz melt in the upper container part and, as the level of the melt is lowered, pass through the throat and contaminate the fused quartz in the lower container part, thus causing the discoloration. Having discovered the cause of the difficulty I have provided means for preventing the contaminating material from passing through the throat by providing a closure member or stopper which floats on the surface of the quartz melt in the upper container part and is of such size relative to the size of the orifice, or smaller opening, of the throat that it closes the throat before the contaminating material on and near the surface of the melt passes through the orifice. This has completely eliminated the discoloration of fused quartz ingots.

In the single figure of the drawing accompanying and forming part of this specification the invention is illustrated in connection with a container made up of two engaging graphite crucibles of a type presently used for producing fused quartz ingots from quartz crystals. In the drawing the crucibles are shown assembled and in vertical section and the furnace in which the assembled crucibles are placed for melting the quartz crystals and forming the ingot is indicated by the single line box. As the furnace constitutes no part of the present invention and is of known structure further illustration and description thereof has been omitted as being unnecessary for a complete understanding of the invention.

As shown in the drawing the cylindrical crucibles 1 and 2 are assembled one above the other in the furnace, indicated at 3, with the upper crucible 1 resting on and supported by the lower crucible 2. The interior of the crucibles 1 and 2 are in communication through a tapered throat defined by the funnel-shaped lower part 4 of the upper crucible 1. The lower crucible 2 has a cover 5 which is open beneath the orifice 6 of the throat. The funnel-shaped part 4 of the crucible 1 has a circular flare 7 at its bottom which rests in a circular centering recess provided in the upper surface of the cover 5 of the crucible 2. The opening in the cover 5 may be of the same size or slightly larger than the circular orifice 6.

The furnace 3 is of a known type in which heat is generated electrically in a sealed chamber which is evacuated during fusion of the quartz crystals placed in the upper crucible 1 and also during the forming of the ingot in the lower crucible 2 which takes place after the quartz crystals have coalesced and the molten quartz has flowed through the tapered throat. In practice the furnace is filled with an inert gas, such as nitrogen, at pressures considerably above atmospheric after the quartz ingot has been formed and is still in molten condition in the lower crucible. The increase in pressure in the furnace effectively reduces the size of those bubbles or voids in the molten quartz ingot which have not been strangled out of the molten quartz as it passes through the tapered throat.

The drawing shows the quartz after the quartz crystals placed in the upper crucible have become molten and coalesced and after the fused quartz has started to flow under gravity from the upper crucible to the lower crucible through the tapered throat defined by the funnel 4. It will be understood, of course, that before the quartz has been brought to this molten condition quartz crystals have been packed in the upper crucible 1, the crucibles have been assembled in the furnace as shown in the drawing and described above, the interior of the furnace has been evacuated and the temperature in the evacuated furnace has been gradually increased to the fusion temperature of quartz, that is, to a temperature of about 1750° C.

In using equipment of this kind heretofore the quartz ingot after cooling and after the crucible 2 has been removed therefrom has frequently been found to be discolored, particularly at the core of the cylindrical ingot, and therefore unsuitable for optical uses, for example.

In accordance with the present invention such discoloration of the ingot is prevented in a positive manner by providing a stopper to close the orifice 6 in the bottom of the funnel 4 and stop the flow of quartz through the orifice just before the contaminated upper portion of the molten quartz mass in the upper crucible 1 flows through the orifice 6.

An effective stopper is a graphite ball, shown at 8, which is placed on top of the mass or charge of quartz crystals packed in the upper crucible 1 before fusion of the crystals. After fusion of the crystals the ball 8 floats freely on the molten quartz in the crucible 1 and, due to its lower density, is slightly more than half submerged in the molten quartz, as shown in full lines in the drawing.

As the level of the molten quartz in the crucible 1 is lowered by flow of the quartz through the orifice 6, the ball 8 approaches the funnel-shaped crucible part 4. If the ball is directly above the orifice of the funnel, the immersed part thereof enters the orifice 6 directly and settles into engagement with the sides of the orifice to gradually close it. The flow of molten quartz through the orifice 6 thus is first slowed, and then completely stopped. The ball 8 in its at rest position in the orifice is shown in broken lines in the drawing. If the ball is off to one side of the orifice it is guided thereto by the sloping sides of the funnel 4 and then settles in the orifice as described above.

I have found that when the orifice 6 of the funnel 4 is approximately two inches in diameter and the sides of the funnel 4 are inclined inwardly toward the center line of the funnel at an angle of about 40 degrees from the vertical, a graphite ball having a diameter of about 3½ inches is effective for closing the orifice before the contaminated upper portion of the melt in the crucible 1 passes through the orifice. In general, I have found that a graphite ball float which circumferentially engages the sides of the orifice at about one-third of the diameter of the ball up from the bottom of the ball is effective for the purpose of stopping up the orifice just prior to the final run-off of the quartz melt and thereby preventing the contaminated surface portion of the melt from entering the lower crucible 2 and discoloring the fused quartz ingot.

While I have shown and described my invention in connection with a particular form of container for fused quartz it will be understood, of course, that numerous changes in the form and details of the container may be made by those skilled in the art without departure from the spirit and scope of the invention as defined in the appended claims, for example, the lower cylindrical crucible 2 may be of suitable shape to form quartz ingots as flat plates of circular or angular shape.

What I claim as new and desire to secure by Letters Patent of the United States is:

1. The method of producing clear fused quartz ingots from quartz crystals in a graphite container which during melting of quartz crystals in the container forms with material from the crystals discoloring reaction products of lower density than molten fused quartz which comprises the steps of melting a charge of quartz crystals in the upper part of the container, causing the molten fused quartz from the bottom of the charge to flow downward by gravity through a constricted passage in the bottom of the upper part of the container, collecting the molten fused quartz in the form of an ingot in the lower part of the container and stopping the flow of molten fused quartz through the passage before the upper surface portion of the melt containing the reaction products enters the lower part of the container whereby to prevent discoloration of the fused quartz ingot in the lower container part by the reaction products present in the upper container part.

2. The method of producing clear fused quartz ingots from quartz crystals in a graphite container which during melting of quartz crystals in the container forms with market from the crystals discoloring reaction products of lower density than molten fused quartz, which comprises the steps of introducing a charge of quartz crystals in the upper part of the container, placing a graphite ball float on the charge, heating the container to melt the charge, causing the molten fused quartz from the bottom of the charge to flow downward by gravity through an orifice in the bottom of the upper part of the container and of smaller diameter than the float, collecting the molten fused quartz in the form of an ingot in the lower part of the container, continuing the heating of the container until the float closes the orifice and stops the flow of molten fused quartz through the orifice before the upper surface portion of the melt containing the reaction products enters the lower part of the container whereby to prevent discoloration of the fused quartz ingot in the lower container part by the reaction products present in the upper container part, and terminating the heating of the container upon closing of the orifice by the float.

References Cited in the file of this patent
UNITED STATES PATENTS

| | | |
|---|---|---|
| 345,874 | Barden | July 20, 1886 |
| 1,022,910 | Whitney | Apr. 9, 1912 |
| 1,581,829 | Berry | Apr. 20, 1926 |
| 2,202,180 | West | May 28, 1940 |